(12) United States Patent
Kangude et al.

(10) Patent No.: US 8,218,500 B2
(45) Date of Patent: Jul. 10, 2012

(54) PRE-SYNCHRONIZATION METHOD FOR HARD HANDOVERS IN WIRELESS NETWORKS

(75) Inventors: Shantanu Kangude, Dallas, TX (US); Pierre Bertrand, Antibes (FR); Ariton E. Xhafa, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 813 days.

(21) Appl. No.: 12/112,422

(22) Filed: Apr. 30, 2008

(65) Prior Publication Data

US 2008/0267131 A1 Oct. 30, 2008

Related U.S. Application Data

(60) Provisional application No. 60/914,937, filed on Apr. 30, 2007.

(51) Int. Cl.
*H04W 36/00* (2009.01)
(52) U.S. Cl. .................................. 370/331; 455/436
(58) Field of Classification Search .................. None
See application file for complete search history.

(56) References Cited

U.S. PATENT DOCUMENTS

| | | | |
|---|---|---|---|
| 7,295,842 B2* | 11/2007 | Yang et al. | 455/436 |
| 2008/0182579 A1* | 7/2008 | Wang et al. | 455/436 |
| 2009/0029713 A1* | 1/2009 | Dharia et al. | 455/450 |
| 2010/0290427 A1* | 11/2010 | Sebire et al. | 370/331 |

OTHER PUBLICATIONS

Reducing Handover Latencies in UL Synchronization and Initial UL Allocation in LTE, Texas Instruments Incorporated, 3GPP TSG RAN WG2 Meeting #56, Riga, Latvia, Nov. 6-10, 2006.
"Non-contention Based Handover Execution", Nokia, 3GPP TSG-RAN WG2 Meeting #55, Riga, Latvia, Nov. 6-10, 2006.
"Access Alternatives for Handover", Alcatel, 3GPP TSG-RAN #56 WG2 LTE, Riga, Latvia, Oct. 6-Nov. 10, 2006.
"Minimizing the Asynchronous RACH Procedure Requirement During LTE Hangover", InterDigital Communications Corporation, 3GPP TSG RAN WG2 #56, Riga, Latvia, Nov. 6-10, 2006.
Non-contention Based Handover Procedure on RACH Channel, ZTE, TSG-RAN Working Group 2 Meeting #56, Riga, Latvia Nov. 6-10, 2006.
Latency and Overhead Comparison for Pre-synchronization in E-UTRA Handovers, Texas Instruments Incorporated, 3GPP TSG RAN WG2 #58, Kobe, Japan, May 7-11, 2007.

* cited by examiner

*Primary Examiner* — Robert Scheibel
(74) *Attorney, Agent, or Firm* — Ronald D. Marshall, Jr.; Wade James Brady, III; Frederick J. Telecky, Jr.

(57) ABSTRACT

A pre-synchronization method in which the source cell chooses a signature for the user equipment (mobile) to use in the target cell for RACH access, and instructs the user equipment to perform RACH access and return to the current cell before a handover command (break command) is issued. This causes parallel execution of the UL synchronization process with the context transfer process among the two base stations.

15 Claims, 4 Drawing Sheets

PRE-SYNCHRONIZATION METHOD FOR HARD HANDOVERS IN WIRELESS NETWORKS

CLAIM OF PRIORITY

This application claims priority under 35 U.S.C. 119(e) (1) to U.S. Provisional Application No. 60/914,937 filed Apr. 30, 2007.

TECHNICAL FIELD OF THE INVENTION

The technical field of this invention is wireless cellular communications and in particular to hard handovers in asynchronous networks.

BACKGROUND OF THE INVENTION

Wireless cellular communication networks incorporate a number of mobile user equipments (UEs) and a number of NodeBs. A NodeB is generally a fixed station and may also be called a base transceiver system (BTS), an access point (AP), a base station (BS) or some other equivalent terminology. NodeB functionality evolves as improvements of networks are made, so a NodeB is sometimes also referred to as an evolved NodeB (eNB). In general NodeB hardware is fixed and stationary. In contrast user equipment hardware is generally portable. User equipment, commonly known as a terminal or a mobile station, may be fixed or mobile device and may be a wireless device, a cellular phone, a personal digital assistant (PDA) or a wireless modem card. Uplink (UL) communication refers to a communication from the mobile user equipment to the NodeB. Downlink (DL) communication refers to communication from the NodeB to the mobile user equipment. Each NodeB contains radio frequency transmitters and receivers used to communicate directly with plural mobiles, which move freely around it. Similarly, each mobile user equipment contains a radio frequency transmitter and a receiver used to communicate directly with the NodeB. In cellular networks, the mobiles cannot communicate directly with each other but must communicate with the NodeB. The coverage area of a NodeB is generally split into multiple serving cells or sectors.

Long Term Evolution (LTE) wireless networks, also known as Evolved Universal Terrestrial Radio Access Network (E-UTRAN), are being standardized by the 3GPP working groups (WG). Orthogonal frequency division multiple access (OFDMA) was chosen for the downlink (DL) of E-UTRAN and single carrier frequency division multiple access (SC-FDMA) was chosen for uplink (UL) of E-UTRAN. OFDMA and SC-FDMA symbols are hereafter referred to as OFDM symbol. User equipments are time and frequency multiplexed on a physical uplink shared channel (PUSCH) and a fine time and frequency synchronization between user equipment guarantees optimal intra-cell orthogonality. The user equipment autonomously maintains its DL synchronization from DL synchronization signals broadcast by the base station. UL synchronization requires base station involvement. In case the user equipment is not UL synchronized, it uses a non-synchronized Random Access Channel (RACH). The base station provides back some allocated UL resource and timing advance information to permit the user equipment to transmit on the PUSCH.

Orthogonal frequency division multiple access (OFDMA) is a multi-user version of orthogonal frequency division multiplexing (OFDM) digital modulation scheme. Multiple access is achieved in OFDMA by assigning subsets of sub-carriers carriers to individual user equipment. This allows simultaneous low data rate transmission from several users. Based on feedback information about the channel conditions, adaptive user-to-sub-carrier assignment can be achieved. If the assignment is done sufficiently fast, this further improves the OFDM robustness to fast fading and narrow-band co-channel interference and makes it possible to achieve even better system spectral efficiency. Different number of sub-carriers can be assigned to different users to support differentiated quality of service (QoS). This controls the data rate and error probability individually for each user.

Control information bits are transmitted in the uplink (UL) for several purposes. For example, a downlink hybrid automatic repeat request (HARQ) requires at least one bit of ACK/NACK transmitted information in the uplink indicating successful or failed circular redundancy checks (CRC). Furthermore, an indicator of downlink channel quality (CQI) needs to be transmitted in the uplink to support mobile user equipment scheduling in the downlink. While CQI may be transmitted based on a periodic or triggered mechanism, the ACK/NACK needs to be transmitted in a timely manner to support the HARQ operation. Note that ACK/NACK is sometimes denoted as ACKNAK or just simply ACK or other equivalent term. In this example, some elements of the control information should be provided additional protection compared with other information. For instance, the ACK/NACK information is typically required to be highly reliable in order to support appropriate and accurate HARQ operation. This uplink control information is typically transmitted using the physical uplink control channel (PUCCH), as defined by the 3GPP working groups (WG), for evolved universal terrestrial radio access (E-UTRA). The E-UTRA is sometimes also referred to as 3GPP long-term evolution (3GPP LTE). The structure of the PUCCH is designed to provide sufficiently high transmission reliability.

In addition to PUCCH, the E-UTRA standard also defines a physical uplink shared channel (PUSCH) intended for transmission of uplink user data. The physical uplink shared channel (PUSCH) can be dynamically scheduled. Thus the time and frequency resources of PUSCH are re-allocated every sub-frame. This reallocation is communicated to the mobile user equipment using the physical downlink control channel (PDCCH). Alternatively, resources of the PUSCH can be allocated semi-statically via a mechanism called persistent scheduling. Thus, any given time and frequency PUSCH resource can possibly be used by any mobile user equipment depending on the scheduler allocation. Physical uplink control channel (PUCCH) is different than the PUSCH. The PUCCH is used for transmission of uplink control information (UCI). Frequency resources which are allocated for PUCCH are found at the two extreme edges of the uplink frequency spectrum. In contrast, frequency resources which are used for PUSCH are in between. Because PUSCH is designed for transmission of user data re-transmissions are possible. The PUSCH is expected to be generally scheduled with less stand-alone sub-frame reliability than the PUCCH. The general operation of the physical channels are described in the E-UTRA specifications, for example: "3GPP TS 36.3211 v8.2.0, $3^{rd}$ Generation Partnership Project; Technical Specification Group Radio Access Network; Evolved Universal Terrestrial Radio Access (E-UTRA); Physical Channels and Modulation (Release 8)." The present invention is described in the context of the E-UTRA wireless network, but applies as well to other asynchronous networks implementing hard handovers.

As the user equipment moves in the network, it will need to handover from a base station of a serving cell to a base station of a target cell. The base station of the target cell is selected to be a better cell at that particular time and location for that user equipment. In cellular networks where the user equipment can be served by multiple base stations simultaneously, the user equipment typically performs a soft handover when transitioning from a cell to another. This means that the user equipment will be served by both base stations during a period of time before finally detaching from the first base station. This has the benefit of providing no interruption time, but requires some complexity which impacts the cost of both user equipment and base station. In cellular networks where the user equipment can be served by only one base station at a time, the user equipment typically performs a hard handover when transitioning from one cell to another. This means that the user equipment first detaches from the first base station before accessing the target base station. This results in some unavoidable interruption time.

A handover process generally consists of two procedures. The first procedure occurs between the two base stations and is called context transfer. The serving base station negotiates user equipment access to the target base station. This includes passing along through a backhaul access all necessary user equipment context information for the target base station to provide a continuous service to the user equipment. The second procedure happens at the user equipment. This second procedure consists of synchronizing and accessing to the target base station from the user equipment. Handover (HO) interruption time in asynchronous wireless networks can be attributed significantly to the process of UL synchronization after breaking from the source cell. The E-UTRA RACH process, especially for the contention based RACH involves significant latencies. The handover latencies need to be minimized in an efficient manner.

For simplicity handover means intra-LTE to inter-base station handover in LTE_ACTIVE. Handover latency begins as soon as the source base station stops transmissions to the user equipment and ends when the first UL message that can potentially carry useful data is transmitted by the target base station. The main cause for handover interruption time is the user equipment must complete any final formalities with the source base station and achieve UL synchronization and initial allocation with the target base station. In synchronous networks, which are networks in which the base stations know the relative time difference between them, the timing advance (TA) in the target base station can be computed autonomously without any initial RACH transmission in the UL of the target base station. However, in asynchronous networks an initial RACH access in the target base station is required for the target base station to compute the TA and forward it to the user equipment in some way.

SUMMARY OF THE INVENTION

This invention is a pre-synchronization method in which the source base station chooses a signature for the user equipment to use in the target base station for RACH access and instructs the user equipment to perform RACH access and return to the current base station before a handover command is issued by the source base station. This causes parallel execution of the UL synchronization process with the context transfer process among the two base stations. This invention thus reduces handover interruption time.

Other solutions simply try to reduce the RACH/UL synchronization latency. Our proposal causes the latency to happen in parallel with other latency. This offers a simple and efficient method for pre-synchronization during handovers. This technique requires no signification additional overhead.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
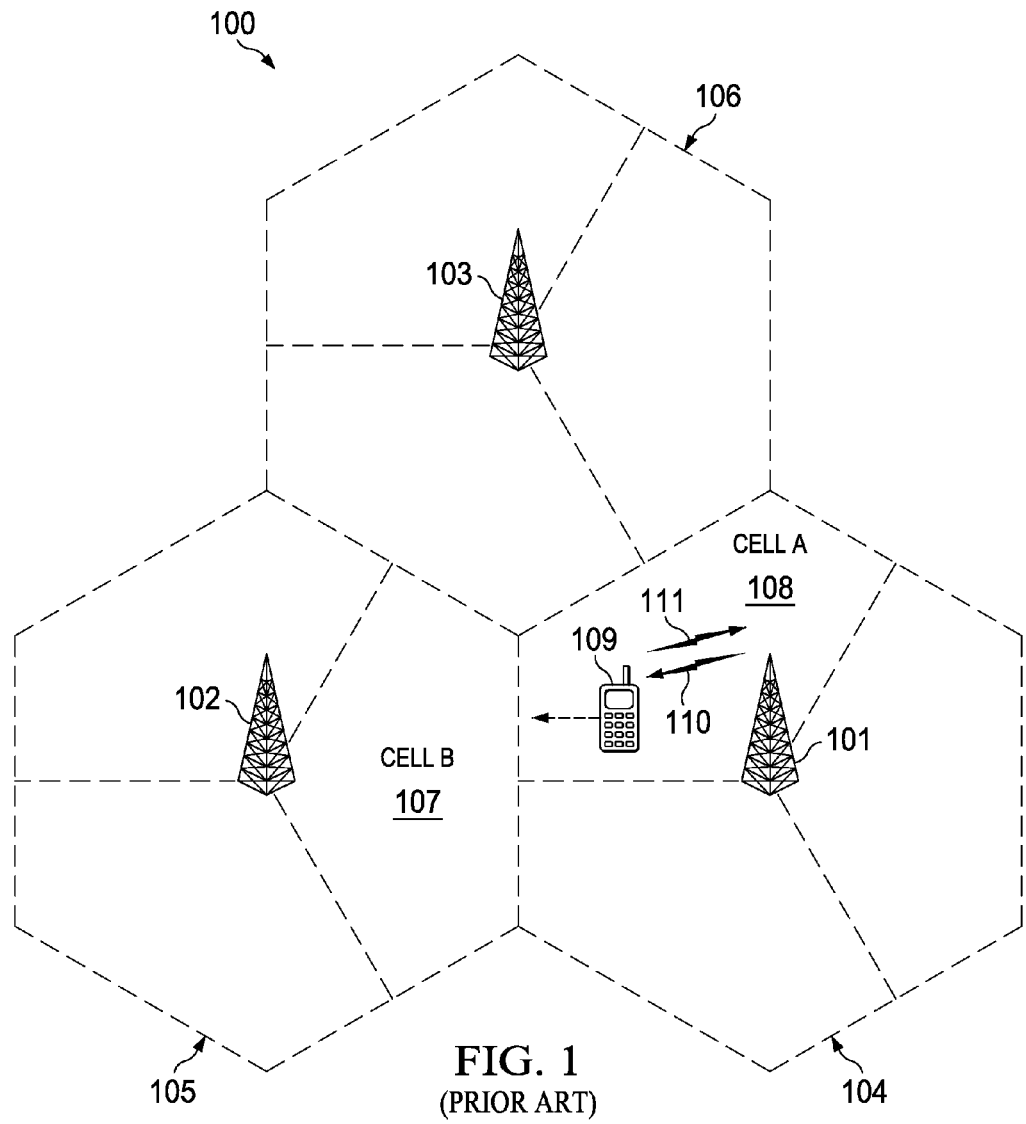
FIG. 1 is a diagram of a communication system of the present invention having three cells.

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 are operable over corresponding coverage areas 104, 105 and 106. Each base station's coverage area is further divided into cells. In the illustrated network, each base station's coverage area is divided into three cells. Handset or other user equipment 109 is shown in Cell A 108. Cell A 108 is within coverage area 104 of base station 101. Base station 101 transmits to and receives transmissions from user equipment 109. As user equipment 109 moves out of Cell A 108 and into Cell B 107, user equipment 109 may be handed over to base station 102. Because user equipment 109 is synchronized with base station 101, user equipment 109 can employ non-synchronized random access to initiate handover to base station 102.

Non-synchronized user equipment 109 also employs non-synchronous random access to request allocation of up-link 111 time or frequency or code resources. If user equipment 109 has data ready for transmission, which may be traffic data, measurements report, tracking area update, user equipment 109 can transmit a random access signal on up-link 111. The random access signal notifies base station 101 that user equipment 109 requires up-link resources to transmit the user equipment's data. Base station 101 responds by transmitting to user equipment 109 via down-link 110, a message containing the parameters of the resources allocated for user equipment 109 up-link transmission along with a possible timing error correction. After receiving the resource allocation and a possible timing advance message transmitted on down-link 110 by base station 101, user equipment 109 optionally adjusts its transmit timing and transmits the data on up-link 111 employing the allotted resources during the prescribed time interval.

Figure 2:
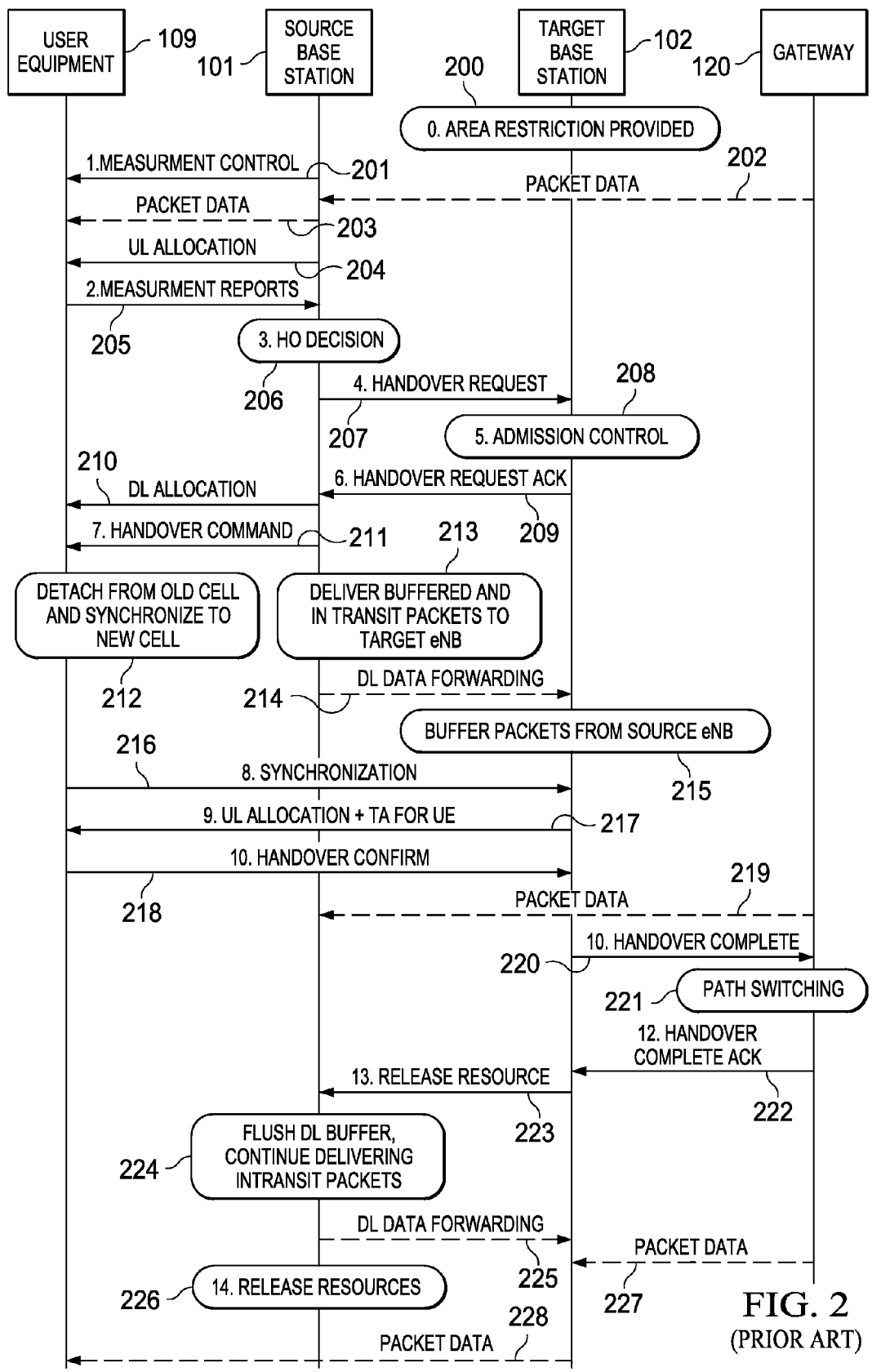
FIG. 2 illustrates the prior art handoff procedure.

FIG. 2 illustrates the current baseline procedure for handover. In FIG. 2, user equipment 109 is in communication with source base station 101 and desires communication with target base station 102. This typically occurs because user equipment 109 passes from Cell A serviced by source base station 101 to Cell B serviced by target base station 102. Base stations 101 and 102 are subject to area restriction 200 to limit communication with out of area user equipment 109. Gateway 120 controls connection to other telephones and other equipment including control of the base station communicating with user equipment 109.

In step 201, source base station 101 transmits a measurement control signal to user equipment 109. Packet data flows from gateway 120 to source base station 101 (step 202).

Packet data flows from source base station 101 to user equipment 109 (step 203). Source base station 101 transmits a UL allocation signal to user equipment 109 (step 204). User equipment 109 responds to the measurement control signal (step 201) with measurement reports (step 205) to source base station 101. Source base station 101 makes the handover decision (step 206). Source base station 101 transmits a handover request signal (step 207) to target base station 102. Target base station 102 determines whether to admit the new user equipment (step 208). If the decision is to admit the user equipment 109, target base station 102 transmits a handover request acknowledge signal (step 209) to target base station 102. Source base station 101 transmits a DL allocation signal (step 210) and a handover command (step 211) to user equipment 109. User equipment 109 detaches from the source base station 101 and synchronizes with the target base station 102 (step 212). Source base station 101 delivers buffered packets in transit to user equipment 109 to the target base station 102 (step 213). This includes DL data forwarding (step 214) from source base station 101 to target base station 102 and target base station 102 buffering these packets (step 215). Note that step 212 includes transmission of a synchronization signal (step 216) from user equipment 109 to target base station 102. Target base station 102 transmitting a UL allocation signal and a TA signal (step 217) to user equipment 109 and user equipment 109 confirming the handover (step 218). Meanwhile data from gateway 120 destined for user group 109 (step 219) continues to be transmitted to source base station 101. Target base station 102 transmits a handover complete signal (step 220) to gateway 120. Gateway 120 switches the path of data destined for user equipment 109 (step 221) and sends a handover acknowledge signal (step 222) to target base station 102. Target base station 102 transmits a release resource signal (step 223) to source base station 101. Thereafter source base station 101 flushes the DL buffer (step 224), continuing to send data destined for user equipment 109 to target base station 102 (step 225). Source base station 101 then releases the resources (step 226) previously devoted to user equipment 109. These resources may now be devoted to other user equipment. Thereafter data packets destined for user equipment 109 are transmitted from gateway 120 (step 227) to target base station 102 for transmission to user equipment 109 (step 228).

The data link between the source base station 101 and user equipment 109 is broken after receiving the handover request ACK (209) from target base station 102. This happens as the source base station 101 decides to stop transmissions to the user equipment and issue a handover command. Any UL or DL data traffic between source base station 101 and user equipment 109 ceases as handover command is issued. Before user equipment 109 can move to the target base station 102 though, it has to complete any formalities of breaking from the source base station 101. This may include possibly sending RLC status report, which includes sending pending RLC ACKs for successfully received DL data, and possibly sending an ACK for the handover command itself. Note that HARQ ACKs will cause some additional delay. This time is known as handover breaking latency. After the handover break, the user equipment 109 can move to the target base station 102. If it has to transmit in the RACH slots, the latency includes the handover UL synchronization latency. This latency includes any RACH slot wait time and RACH turnaround latency, which is the time since the RACH slot transmission and the first UL transmission that can possibly carry data. In a completely serial process of FIG. 2, the handover latency is a sum of the handover breaking latency, the RACH slot wait time and the RACH turnaround latency.

Before the actual handover request initiation, there are several protocol events that need to happen. As shown in FIG. 2, measurement reports are sent to the source base station 101 to aid it in the evaluation of possible candidates for handover. In addition, an easy optimization that reduces latencies is for the user equipment 109 to provide the DL timing difference between the two base stations (the source and the target) along with the measurements. This is possible by letting the user equipment 109 get the target base station's frame and sub-frame synchronization. Frame synchronization is obtained from the knowledge of the target base station's system time or equivalently the system frame number (SFN) of the current frame received from the target base station. The SFN may be coded and transmitted as part of the cell-specific system information available on a broadcast channel, or may be coded in the DL synchronization channels and also used by the UE to get DL synchronization and other handover related measurements. Note that the DL timing difference cannot help in finding the UL timing advance unless the two base stations are synchronized. This invention addresses hard handovers between non-synchronized base stations. The DL timing difference with the target base station's SFN information helps the source base station 101 know when the RACH slots and other frame portions happen in the target base station 102. Other aspects such as the target base station 102 RACH hopping pattern, the signature set being used, etc. are already known to the source base station 101 through the X2 interface. In another embodiment, the RACH slots are designed so that the user equipment can access them with only sub-frame synchronization without needing frame synchronization. Using all of the available information, the source base station 101 helps the user equipment in the pre-synchronizing process as described below.

In order to reduce the handover interruption latency, this invention uses a pre-synchronization method that cause parallel execution of the UL synchronization process and the context transfer processes between base stations. When the source base station 101 sends the handover request to the target base station 102, it also sends a handover indication message to the user equipment 109. This message provides the user equipment 109 with the information that the source base station 101 is initiating a context transfer to the target base station 102 and causes the user equipment 109 to initiate a UL synchronization process with the target base station 102. This handover indication message also provides the user equipment 109 with all the information needed to initiate the pre-synchronization process. The method for the cases of contention-free and contention based RACH access is described below.

In this method the source base station 101 provides the user equipment 109 with a handover reserved RACH signature from the target base station's handover reserved signature set. This requires that each base station allocate one signature each from the sets of handover reserved signatures of all neighbors for it to use during handovers. Thus cells provide one of their handover reserved signatures to the neighboring cells that belong to different base stations. If the number of neighboring cells in different base stations is larger than the available handover reserved signatures, then a majority of these handover reserved signatures are allocated to the neighbors that have the highest handover coming from them into the cell. The remaining signatures are always allocated to be provided to other base stations on a need basis.

Figure 3:
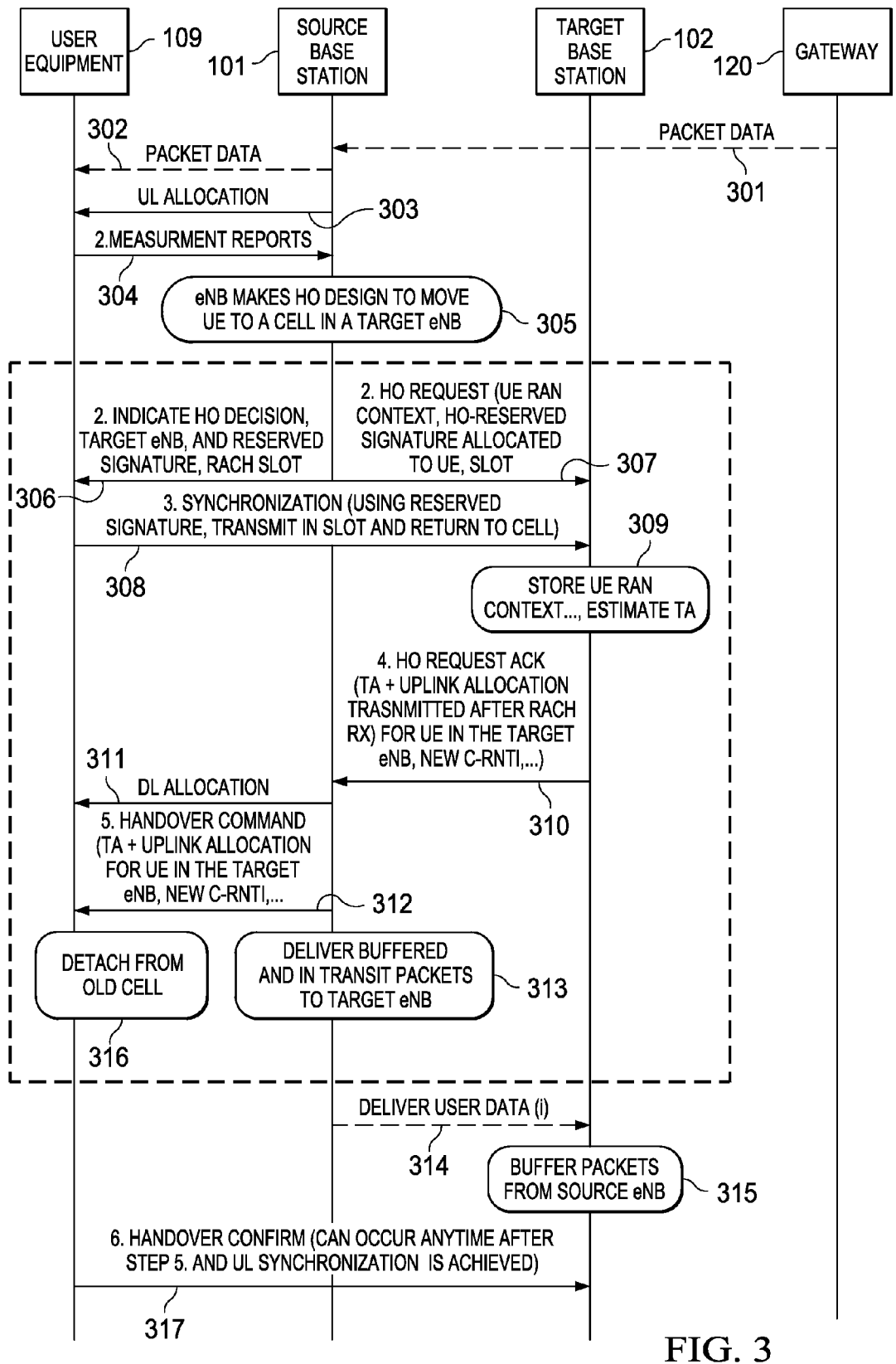
FIG. 3 illustrates a contention free handoff procedure according to a first embodiment of this invention.

FIG 3 illustrates the communications process according to a first embodiment of this invention. Initially packet data from gateway 120 is transmitted to source base station 101 (step 301) the current base station for transmission to user equipment 109 (step 302). In step 302, source base station 101 transmits a measurement control signal to user equipment 109. Source base station 101 transmits a UL allocation signal to user equipment 109 (step 303). User equipment 109 responds with measurement reports (step 304) to source base station 101. Source base station 101 makes the handover decision (step 305). Source base station 101 then sends a handover indication to user equipment 109 (step 306) with the reserved signature to use and the RACH slot to use with target base station 102. Source base station 101 also initiates a handover request to target base station 102 in parallel (step 307). This also includes the communications parameters. Source base station 101 knows the RACH slot when user equipment 109 accesses target base station 102 and does not schedule it near that slot.

User equipment 109 accesses RACH with the reserved signature in the specified slot in target base station 102 (step 308). User equipment 109 then returns to source base station 101 communication.

The handover request from source base station 101 includes the slot in which the user equipment accesses the RACH with the reserved signature. Given the non-predictable latency over the backhaul interface X2, user equipment 109 may already have sent the RACH preamble before target base station 102 has received the handover request. However, target base station 102 identifies the signature as being a reserved signature for handover and does not send a RACH response. After target base station 102 receives the handover request (step 307), target base station 102 stores the communications parameters (step 309) enabling recognition of the initial signal from user equipment 109. Also after target base station 102 receives the handover request, it sends the timing advance of user equipment 109 to source base station 101 along with a handover request acknowledge (ACK) message (step 310). This message also carries the C-RNTI, which is a unique cell specific user equipment identifier, and other information that helps source base station 101 in issuing the handover command to user equipment 109.

The handover request ACK message (step 310) also includes the initial UL allocation for user equipment 109 in target base station 102. Source base station 101 transmits a DL allocation to user equipment 109 (step 311). Since the X2 interface latency until the message reaches source base station 101 is not known exactly, the UL allocation issued uses the mean X2 latency, and allocates for a TTI shortly after that. The allocation involves a synchronous non-adaptive HARQ with retransmissions allocated to occur regularly in time such as every 5 ms using known resources. The maximum retries can be 2 or 3. When the handover request ACK (step 310) reaches the source base station 101, it may reach before or after the first allocation (step 312). Most likely it will reach before the first allocation.

Source base station 101 receives the handover request ACK (step 310), and checks to see which UL allocation use equipment 109 can access in target base station 102. This could be the first try or the HARQ retry instants. Source base station 101 then issues the handover command (step 312) to user equipment 109. This includes the TA information and the UL allocation information in target base station 102. The handover command (step 312) is issued at an instant so that there is enough time for any handover breaking latency before the allocation in target base station 102 can be used. Source base station 101 then disconnects from user equipment 109. During the interval before target base station 102 does all data transfer, source base station 101 buffers any data destined for user equipment 109 (step 313) and transmits these to target base station 102 (step 314). Source base station 102 buffers such data packets destined for user equipment 109 until communication is established (step 315).

After receiving the handover command (step 312), user equipment 109 detaches from source base station 101 (step 316). User equipment 109 also sends a handover confirm signal to target base station 102 (step 317) in the UL allocation. The rest of the process is as shown in FIG. 2.

Figure 4:
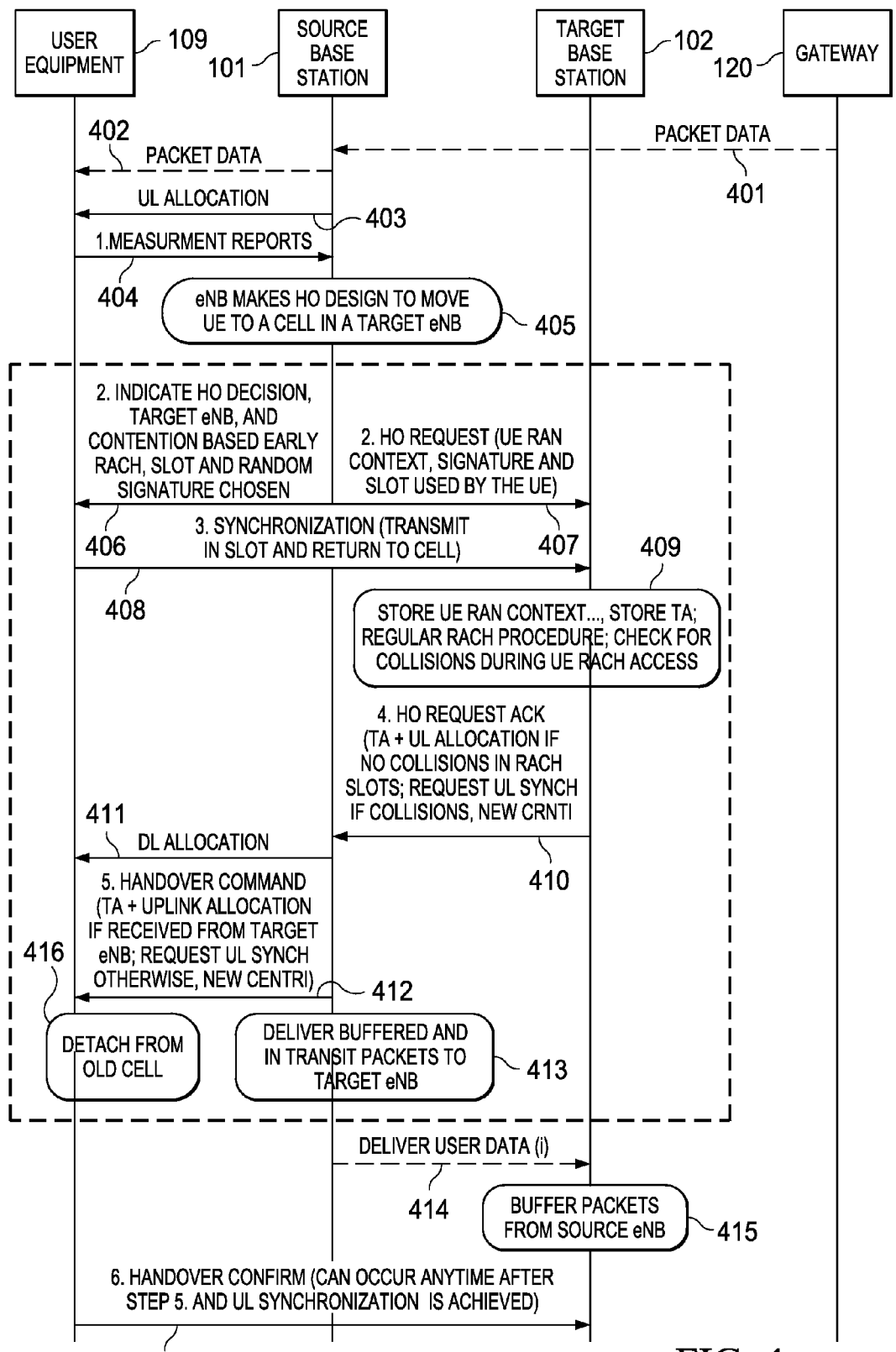
FIG. 4 illustrates a contention handoff procedure according to a second embodiment of this invention

FIG. 4 illustrates the second embodiment of this method which uses pre-synchronization based upon contention based RACH access. The pre-synchronization method with contention based access is identical to the contention-free access method illustrated in FIG. 3. As previously illustrated in FIG. 3, the UL synchronization process happens in parallel with the context transfer process. However, there are certain differences because of RACH procedure differences, and there is no longer a need that any signatures be pre-available at the source base station. This method is invoked when no handover reserved signature from target cell is available.

Initially packet data from gateway 120 is transmitted to source base station 101 (step 401) the current base station for transmission to user equipment 109 (step 402). In step 402, source base station 101 transmits a measurement control signal to user equipment 109. Source base station 101 transmits a UL allocation signal to user equipment 109 (step 403). User equipment 109 responds with measurement reports (step 404) to source base station 101. Source base station 101 makes the handover decision (step 405). Source base station 101 then sends a handover indication to user equipment 109 (step 406) with the RACH slot and RACH unreserved signature to use with target base station 102. Source base station 101 also initiates a handover request to target base station 102 in parallel (step 307). This also includes the communications parameters. Source base station 101 knows the RACH slot when user equipment 109 accesses target base station 102 and does not schedule it near that slot.

User equipment 109 accesses RACH in the specified slot in target base station 102 (step 408). User equipment 109 accesses RACH with source base station 101 chosen unreserved signature in the target base station 102 slot specified, then reverts to communication with source base station 101. This reversion enables the signature to be reused by target base station 102 and issued to other user equipments handing over to target base station 102 and for use of other slots of target base station 102.

Step 409 occurs as follows. Target base station 102 follows the normal RACH procedure with expectations of messages 2, 3 and 4. However, user equipment 109 is not in the target cell for any of messages 2, 3 and 4. Therefore, user equipment 109 will disregard message 2 and will not send message 3. This will result in the termination of the Random Access procedure at target base station 102 by the termination of the HARQ process of message 3. This invention proposes to not exceed 2 total retransmissions anyway. Target base station 102 stores the timing advance information for all of the RACH accesses for somewhat longer than otherwise. This may be 20 mS longer. Note that there is no storage or processing issue because of this.

The handover request (step 407) from source base station 101 includes the slot in which the user equipment accesses the RACH, and also the un-reserved signature user equipment 109 is using. Target base station 102 checks to verify if there was a collision in that RACH slot with that signature. Existence of a message 3 with sufficient power detected for the same RACH slot and the same signature, implies there was a collision. This is because user equipment 109 did not transmit any message 3. If there was a collision between user equipment 109 from different neighboring base stations, target base station 102 will also be aware of it when receiving the handover requests from the different base stations.

If there was a collision, then the timing advance information for user equipment 109 is not available. Target base station 102 sends a handover request ACK indicating that the UL synchronization procedure is still required. This handover request ACK includes the new C-RNTI and other relevant information.

If there was no collision detected, then target base station 102 sends a handover request ACK to source base station 101 (step 410) with the timing advance and an UL allocation for the user equipment. The UL allocation takes into account the mean X2 interface latency, and provides for synchronous non-adaptive HARQ with periodic retransmissions such as every 5 ms. The UL allocation process is similar to that above in the pre-synchronization method with reserved signatures. Source base station 101 transmits a DL allocation to user equipment 109 (step 411).

If the message (step 410) indicates that UL synchronization is still required, source base station 101 sends a handover command to user equipment 109 (step 412). This handover command indicates that user equipment 109 should perform the RACH process afresh. In this case, the rest of the handover process is exactly as in FIG. 2.

If the message (step 410) indicates the timing advance and the UL allocation, source base station 101 issues a handover command to user equipment 109 with the UL allocation just as in the reserved signatures pre-synchronization method illustrated in FIG. 3. The handover command is issued at an instant so that there is enough time for any handover breaking latency before the allocation in the target cell can be used.

After receiving the handover command (step 412), user equipment 109 detaches from base station 101 (step 416). User equipment 109 also sends a handover confirm signal to base station 102 (step 417) in the UL allocation. The rest of the process is as shown in FIG. 2.

As illustrated in FIGS. 3 and 4, the initial UL allocation for user equipment 109 in target base station 102 is sent to it along with the handover command from source base station 101. The UL allocation is with HARQ retransmission instants separated by a constant duration such as 5 mS. The interruption time after the handover command is thus bounded by 5 ms in the pre-synchronization method. The handover latency gains for the contention based methods are much more because of the long contention based RACH process that executes in parallel with the context transfer.

Another aspect of the interruption time is any time before handover command that user equipment 109 is not available to be scheduled by source base station 101. In the pre-synchronization method described above, this gap is only of the order of one RACH slot because user equipment 109 transmits in the appropriate RACH slot of source base station 101 and returns to source base station 101. This interruption time is bounded by 2 slots or 2 ms and is only for UL transmission and does not include DL interruption time.

This invention required the following. One reserved signature needs to be provided to each of the most likely neighbors from which a handover is likely. And these cells are cells that belong to another base station. Base stations have to store the TA information that they computed in each RACH slot and each preamble they received for some time after the RACH slots. This is until they can receive the handover request from the source base station and match the context information with the TA they observed in specific RACH slots. This aspect is common to the contention based and the contention free approach. Another potential overhead is that of the RACH responses that the user equipment is not present to receive in the target base station. This is not an overhead as it would have happened anyway even in the case pre-synchronization was not used. The UL allocation with HARQ and retransmission intervals of 5 ms can be an overhead if the first or any UL allocation instant is past when the handover command reaches the user equipment. This may happen if the handover request ACK packet takes more time to reach the source base station than the average transmission time estimated between the two base stations. The inventors believe the overhead of these missed allocations to be insignificant because we expect the instants when the loss occurs are minimal. The pre-synchronization method of this invention provides latency gains in the handover process without significant overhead.

This invention proposes a pre-synchronization handover method in an intra-LTE inter-base station scenario for reducing handover latencies. This invention reduces latencies by causing the synchronization procedure to be in parallel to the context transfer process. This invention is useful for both the case when a reserved signature is available as well as when it is not.

The 3GPP E-UTRAN standard specifies primarily use of contention free (reserved signatures) technique for RACH access for handover. The contention based approach is considered a fallback mechanism when a reserved signature is not available. The number of reserved signatures will be provisioned so that the probability of contention based approach is low (<0.5% or lower). Whether the contention based or the contention free process is used affects the RACH turnaround latency.

What is claimed is:

1. A method of handover of user equipment from a source base station currently communicating with the user equipment to a target base station to communicate with the user equipment in the future comprising the steps of:

the source base station (1) communicating to the user equipment a handover indication and communications parameters for synchronization of the user equipment and the target base station and (2) simultaneously communicating to the target base station a handover request of the user equipment to the target base station and the communications parameters for synchronization of the user equipment and the target base station;

the user equipment transmitting a synchronization signal to the target base station using the communications parameters;

the target base station storing said communications parameters and recognizing a synchronization signal using said communications parameters as originating from the user equipment;

following receipt of said synchronization signal, the target base station estimating the user equipment UL timing and deriving a timing adjustment (TA) command;

following receipt of both said synchronization signal and said handover request, the target base station determining communications parameters for handover confirmation of the user equipment to the target base station;

the target base station transmitting to the source base station a handover request acknowledge signal and said communications parameters;

following receipt of said handover request acknowledge signal, the source base station transmitting to the user equipment a handover command and said communications parameters; and following receipt of said handover command and said communications parameters, the user equipment transmitting a handover confirmation signal to the target base station.

2. The method of claim 1, wherein:
said communications parameters for synchronization of the user equipment and the target base station define a physical radio resource for communicating the synchronization signal between the user equipment and the target base station; and
said step of the source base station simultaneously communicating includes parameters identifying said physical radio resource.

3. The method of claim 2, wherein:
said physical radio resource is defined by a transmission time slot, frequency and code sequence.

4. The method of claim 3, further comprising:
reserving a transmission time slot, frequency and code sequence for communicating the synchronization signal between the user equipment and the target base station.

5. The method of claim 4, wherein:
said step of reserving reserves at least one physical radio resource to each neighboring base station from which a handover is likely.

6. The method of claim 5, wherein:
said step of reserving further reserves at least one physical radio resource for additional base stations.

7. The method of claim 1, wherein:
said communications parameters for handover confirmation of the user equipment to the target base station include a timing adjustment (TA) command, the user equipment unique identifier in the target base station, and at least one UL physical radio resources to be used by the user equipment in said step of user equipment transmitting a handover confirmation signal to the target base station.

8. The method of claim 1, further comprising:
the user equipment no longer communicating with the source base station upon receipt of said handover command.

9. A method of handover of user equipment from a source base station currently communicating with the user equipment to a target base station to communicate with the user equipment in the future comprising the steps of:
the source base station simultaneously communicating with the user equipment and the target base station a handover request of the user equipment to the target base station and communications parameters for synchronization of the user equipment and the target base station;
the user equipment transmitting a synchronization signal to the target base station using the communications parameters;
the target base station storing said communications parameters and recognizing a synchronization signal using said communications parameters as originating from the user equipment;
following receipt of said synchronization signal, the target base station estimating the user equipment UL timing and deriving a timing adjustment (TA) command;
following receipt of both said synchronization signal and said handover request, the target base station determining communications parameters for handover confirmation of the user equipment to the target base station;
the target base station transmitting to the source base station a handover request acknowledge signal and said communications parameters;
following receipt of said handover request acknowledge signal, the source base station transmitting to the user equipment a handover command and said communications parameters;
following receipt of said handover command and said communications parameters, the user equipment transmitting a handover confirmation signal to the target base station;
said communications parameters for synchronization of the user equipment and the target base station define a physical radio resource for communicating the synchronization signal between the user equipment and the target base station;
said step of the source base station simultaneously communicating includes parameters identifying said physical radio resource;
not reserving a unique physical radio resource for communicating the synchronization signal between the user equipment and the target base station; and
wherein said step of the user equipment transmitting a synchronization signal includes contention for communication resources using said communications parameters.

10. The method of claim 9, wherein:
said physical radio resource is defined by a transmission time slot, frequency and code sequence.

11. The method of claim 10, further comprising:
reserving a transmission time slot, frequency and code sequence for communicating the synchronization signal between the user equipment and the target base station.

12. The method of claim 11, wherein:
said step of reserving reserves at least one physical radio resource to each neighboring base station from which a handover is likely.

13. The method of claim 12, wherein:
said step of reserving further reserves at least one physical radio resource for additional base stations.

14. The method of claim 9, wherein:
said communications parameters for handover confirmation of the user equipment to the target base station include a timing adjustment (TA) command, the user equipment unique identifier in the target base station, and at least one UL physical radio resources to be used by the user equipment in said step of user equipment transmitting a handover confirmation signal to the target base station.

15. The method of claim 9, further comprising:
the user equipment no longer communicating with the source base station upon receipt of said handover command.

* * * * *